(12) United States Patent
Foster et al.

(10) Patent No.: US 11,751,533 B2
(45) Date of Patent: Sep. 12, 2023

(54) CARDBOARD BOX FOR TRANSPORTING QUANTITIES OF SMALL ANIMALS

(71) Applicant: BLACK CREEK QUAIL FARM, LLC, Collinsville, AL (US)

(72) Inventors: Lance M. Foster, Collinsville, AL (US); Sheri B. Foster, Collinsville, AL (US)

(73) Assignee: BLACK CREEK QUAIL FARM, LLC, Collinsville, AL (US)

( * ) Notice: Subject to any disclaimer, the term of this patent is extended or adjusted under 35 U.S.C. 154(b) by 0 days.

(21) Appl. No.: 16/804,497

(22) Filed: Feb. 28, 2020

(65) Prior Publication Data

US 2021/0267159 A1    Sep. 2, 2021

(51) Int. Cl.
*A01K 1/02* (2006.01)
*B65D 5/42* (2006.01)
*B65D 85/50* (2006.01)

(52) U.S. Cl.
CPC .......... *A01K 1/0245* (2013.01); *B65D 5/4295* (2013.01); *B65D 85/50* (2013.01)

(58) Field of Classification Search
CPC ........ A01K 31/08; A01K 31/06; A01K 1/031; A01K 31/002; A01K 31/00
See application file for complete search history.

(56) References Cited

U.S. PATENT DOCUMENTS

| | | | | | |
|---|---|---|---|---|---|
| 1,970,751 | A | * | 8/1934 | Holbrook | B65D 5/4295 229/120.1 |
| 2,328,689 | A | * | 9/1943 | Shofer | B65D 5/4295 229/120.1 |
| 2,398,797 | A | * | 4/1946 | Stein | B65D 5/4295 229/148 |
| 2,507,978 | A | * | 5/1950 | Jubin | B65D 5/6667 229/125.28 |
| 3,507,441 | A | * | 4/1970 | Giroud | B65D 5/48022 229/109 |
| 4,928,630 | A | * | 5/1990 | Kupersmit | A01K 1/0245 220/492 |
| 5,370,079 | A | * | 12/1994 | Smith | A01K 1/031 229/125.21 |
| 2016/0183498 | A1 | * | 6/2016 | Omland | A01K 31/10 119/497 |
| 2020/0247577 | A1 | * | 8/2020 | Dykeman | B65D 5/48024 |

* cited by examiner

*Primary Examiner* — Monica L Perry
*Assistant Examiner* — Brittany A Lowery
(74) *Attorney, Agent, or Firm* — GARDNER GROFF & GREENWALD, PC (57) ABSTRACT

An animal transfer box for containing and transporting live animals, such as quail, includes two ventilated end panels opposite each other, two ventilated side panels opposite each other and connected to the end panels, a substantially non-ventilated bottom panel connected to the side panels, and a ventilated top panel connected to the side panels. Feet are secured to the bottom panel for supporting the bottom panel above a surface upon which the animal transfer box may be resting. The animal transfer box is formed from a single blank of cardboard having tabs and slots formed therein for securing the shape of the animal transfer box upon assembly. The end panels each comprise double-wall panels and one of the end panels has a full-length door while the other end panel has a partial-length door.

7 Claims, 8 Drawing Sheets

CARDBOARD BOX FOR TRANSPORTING QUANTITIES OF SMALL ANIMALS

BACKGROUND

For transporting small live animals, various devices have been used, such as wire cages, wooden boxes, and cardboard containers. For transporting small birds and similarly sized live animals, such as quail, a perforated cardboard box with a perforated removable lid has been employed.

Known devices fail to provide an optimum solution. Indeed, it would be advantageous if an animal transfer box could be provided which addresses some of the following criteria: ease of insertion, ease of removal, maintaining animal hygiene and health, ease of stacking for shipment, etc. It is to the provision of such an animal transfer box addressing such criteria that the present invention is primarily directed.

SUMMARY OF THE INVENTION

Briefly described, in a preferred form the present invention comprises an animal transfer box for containing and transporting smallish live animals, such as quail. Preferably, the animal transfer box includes two ventilated end panels opposite each other, with at least one of the end panels having an openable door formed therein. Two ventilated side panels are provided opposite each other and connected to the end panels. A substantially non-ventilated bottom panel is connected to the side panels, as is a ventilated top panel. Spacers are secured adjacent edges of the top panel for allowing multiple ones of the transfer box to be stacked while still providing ventilation through the top panels. Alternatively, the spacers can be positioned adjacent corners or edges of the bottom panel.

Preferably, the end panels, the side panels, the bottom panel, and the top panel are formed from a single blank of cardboard and folded up to form the animal transfer box, the single blank of cardboard having tabs and slots formed therein for securing the shape of the animal transfer box upon erection. Preferably, the single blank of cardboard comprises corrugated cardboard.

Preferably, the end panels each comprise double-wall panels. Also preferably, one of the end panels comprises a full-length door and the other of the end panels comprises a partial-length door.

Preferably, the end panels and the side panels are between about 4 inches and 6 inches high. More preferably, the end panels and the side panels are between about 4½ inches and 5½ inches high.

In another example embodiment, the animal transfer box includes a first ventilated end panel having a partial-length door formed therein extending only partially along the first ventilated end panel, and a second ventilated end panel having a full-length door formed therein and positioned opposite the first ventilated end panel, the full-length door extending along substantially the entirety of the length of the first ventilated end panel. Two ventilated side panels are opposite each other and connected to the end panels. A substantially non-ventilated bottom panel is connected to the side panels, as is a ventilated top panel. Preferably, the end panels, the side panels, the bottom panel, and the top panel are formed from a single blank of cardboard and folded up to form the animal transfer box. The single blank of cardboard has tabs and slots formed therein for securing the shape of the animal transfer box upon assembly.

Preferably, spacers are positioned adjacent corners of the top panel for allowing multiple ones of the transfer box to be stacked while still providing ventilation through the top panels. Alternatively, the spacers can be positioned adjacent corners or edges of the bottom panel. Also preferably, the single blank of cardboard comprises corrugated cardboard.

Preferably, the end panels each comprise double-wall panels. Preferably, the side panels are between about 4½ inches and 5½ inches high.

In another example embodiment, the animal transfer box includes two ventilated end panels opposite each other, with at least one of the end panels having an openable door formed therein. Two ventilated side panels are opposite each other and connected to the end panels. A substantially non-ventilated bottom panel is connected to the side panels. Further, a ventilated top panel is connected to the side panels. The end panels, side panels, bottom panel, and top panel are formed from a single blank of cardboard and folded up to form the animal transfer box.

Preferably, spacers are secured to and extending from said top panel. Also preferably, the single blank of cardboard comprises corrugated cardboard. Preferably, the single blank of cardboard comprises tabs and slots formed therein for securing the shape of the animal transfer box once assembled.

Preferably, the end panels each comprise double-wall panels. Preferably, one of the end panels comprises a full-length door and the other of the end panels comprises a partial-length door.

Preferably, the end panels and the side panels are between about 4 inches and 6 inches high. More preferably, the end panels and the side panels are between about 4½ inches and 5½ inches high.

These and other features and advantages of the present invention will become more apparent upon reading the following specification in conjunction with the accompanying drawing figures.

DETAILED DESCRIPTION

Referring now in detail to the drawing figures, wherein like reference numerals represent like parts throughout the several views, FIGS. 1-10 generally show in example form an animal transfer box 10 for containing and transporting live animals, such as quail, which includes two ventilated end panels opposite each other, two ventilated side panels opposite each other and connected to the end panels, a substantially non-ventilated bottom panel connected to the side panels, and a ventilated top panel connected to the side panels. Spacers are secured to the top panel for allowing multiple ones of the animal transfer box to be stacked while still providing ventilation through the top or bottom panels. Alternatively, the bottom panel can be ventilated, and the top panel can be substantially non-ventilated. In other forms, both top and bottom panels can be ventilated or substantially non-ventilated. In some forms, the spacers can be positioned adjacent corners or edges of the bottom panel, in which case they might be referred to as feet. The animal transfer box is formed from a single blank of cardboard having tabs and slots formed therein for securing the shape of the animal transfer box upon assembly. The end panels each comprise double-wall panels and one of the end panels has a full-length door while the other end panel has a partial-length door.

Figure 1:
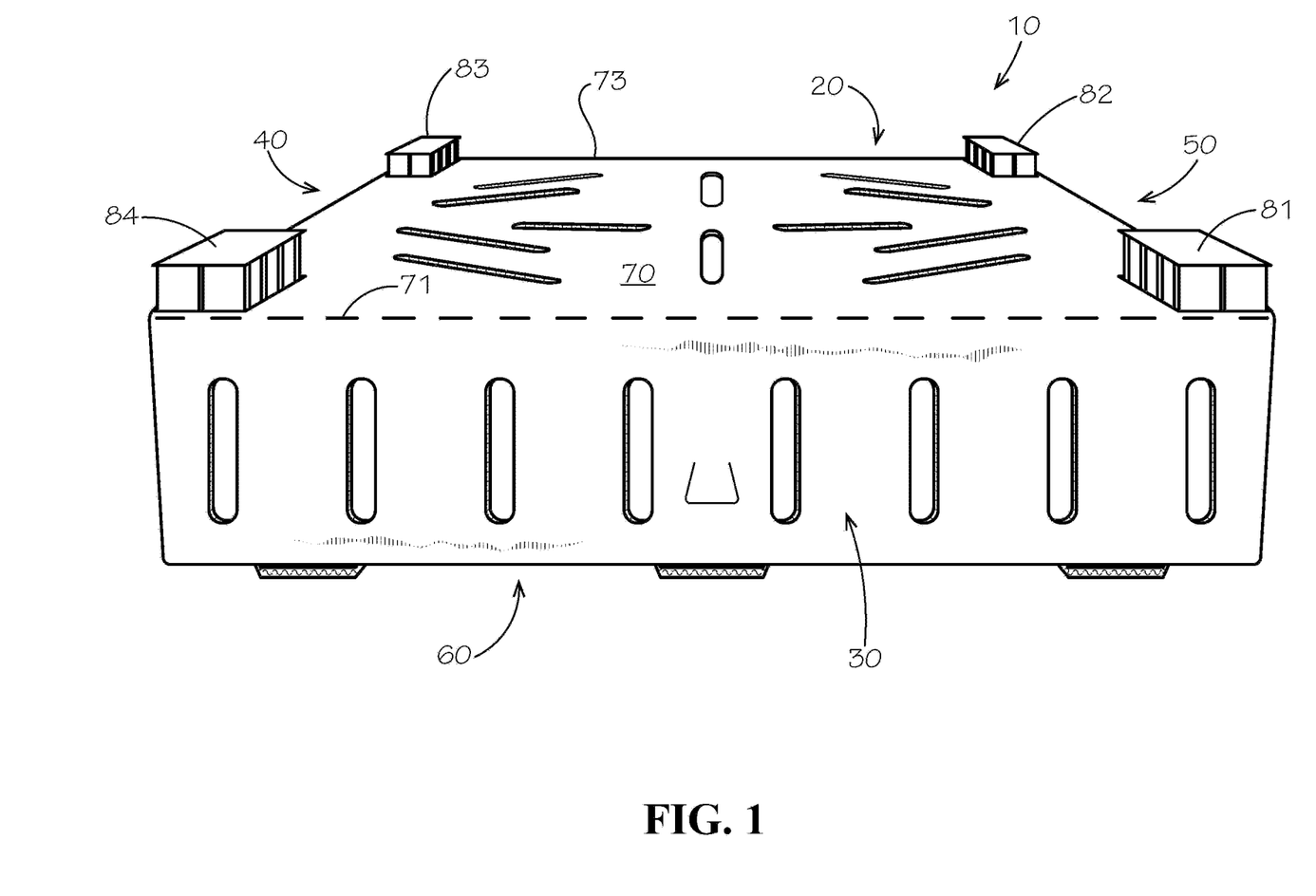
FIG. 1 is a top, perspective view of an animal transfer box according to a preferred form of the invention.
Figure 2:
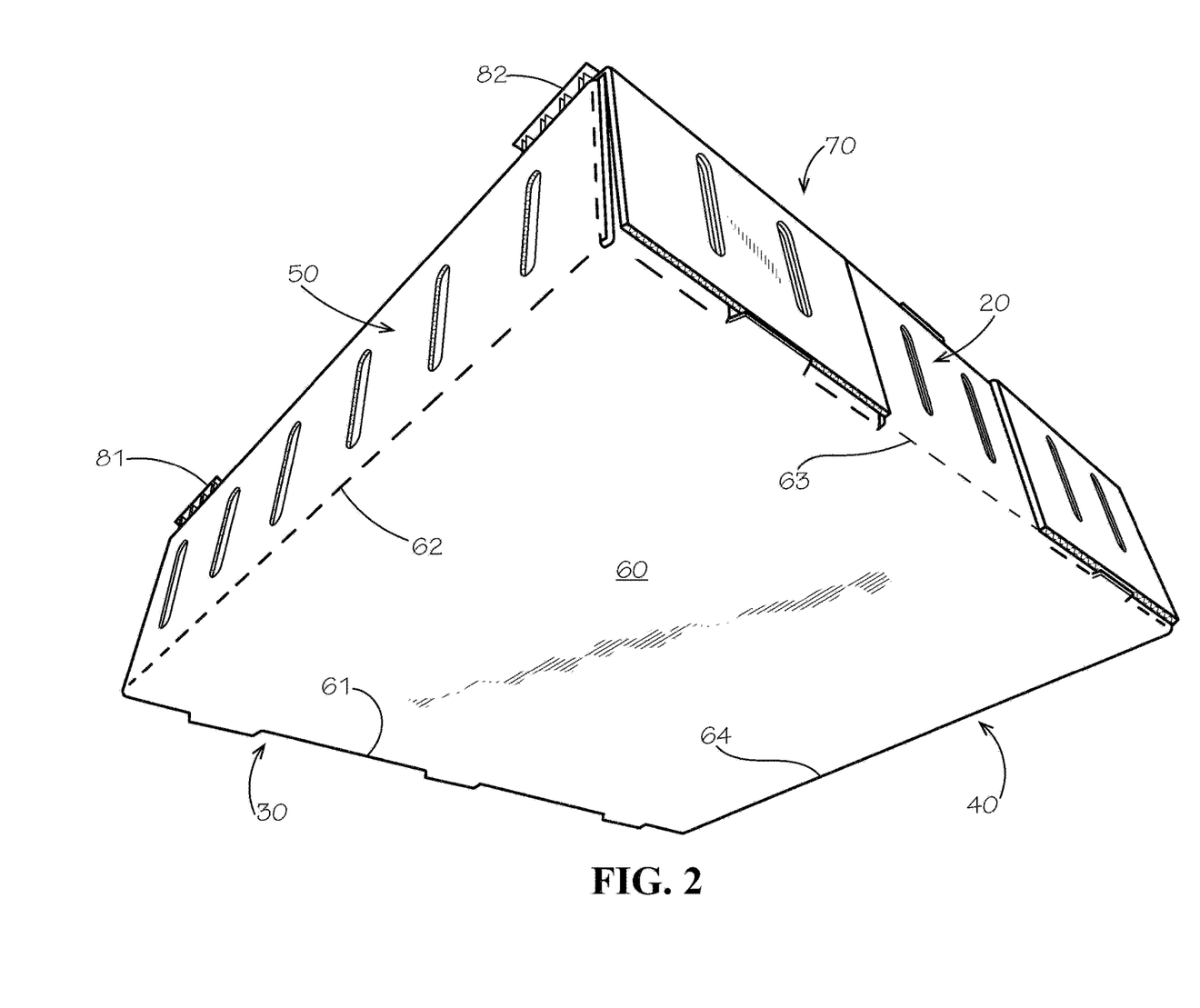
FIG. 2 is a perspective view of the animal transfer box of FIG. 1, viewed from below.
Figure 3:
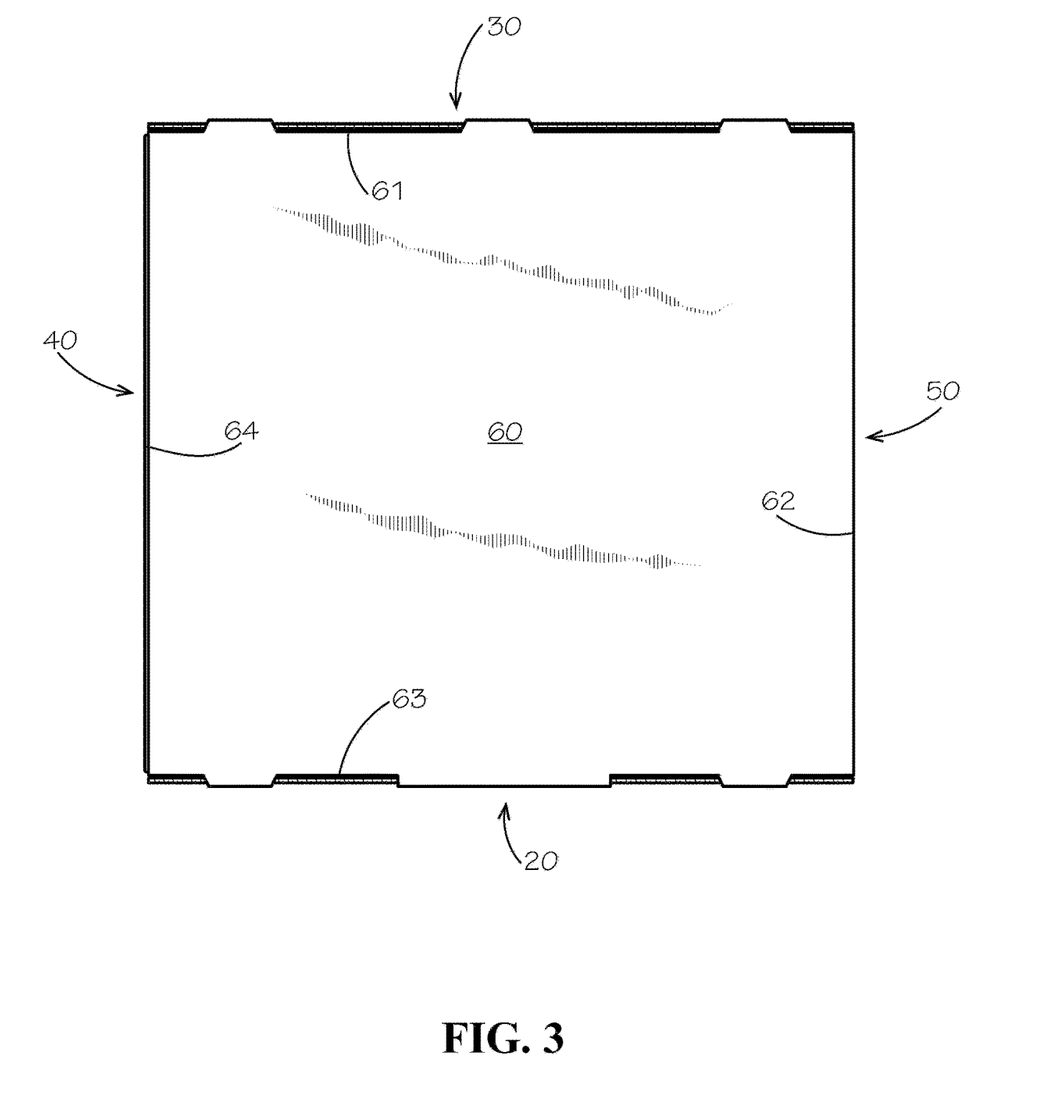
FIG. 3 is a bottom view of the animal transfer box of FIG. 1.

As depicted in FIG. 1 and subsequent figures, the example animal transfer box 10 for containing and transporting live animals, such as for example, quails, rodents, rabbits, snakes and other small mammals, birds, and/or reptiles, includes two ventilated end panels 20, 30 opposite each other, two ventilated side panels 40, 50 opposite each other and connected to the end panels 20, 30, a substantially non-ventilated bottom panel 60 connected to the side panels 40, 50, and a ventilated top panel 70 connected to the side panels 40, 50. Spacers 81-84 are secured to the top panel 70 for allowing multiple ones of the transfer box to be stacked while still providing ventilation through the top or bottom panels.

The animal transfer box is formed from a single blank of cardboard having tabs and slots formed therein for securing the shape of the animal transfer box upon assembly. The end panels each comprise double-wall panels and one of the end panels has a full-length door while the other end panel has a partial-length door.

Figure 10:
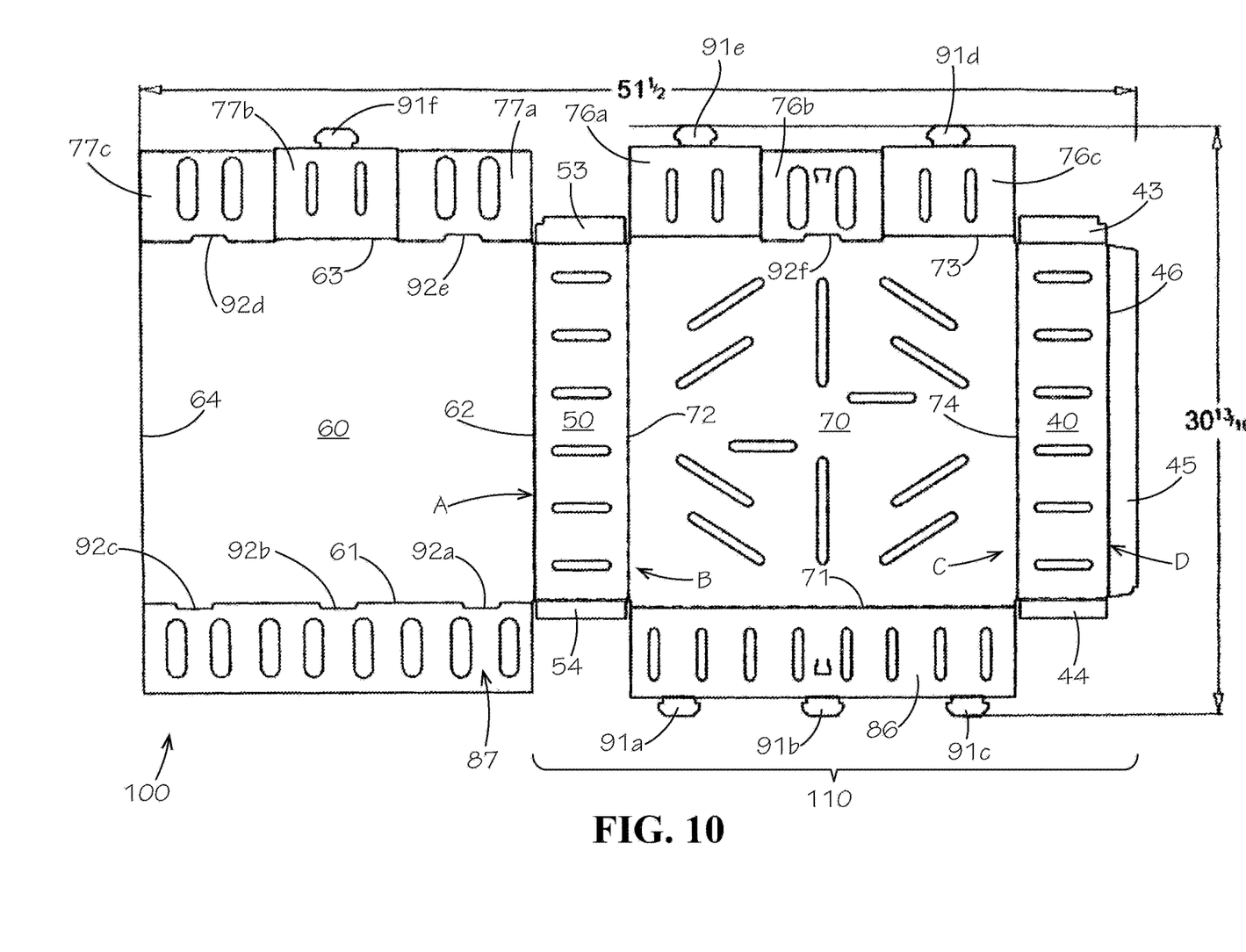
FIG. 10 is a plan view of a cardboard blank cut and scored for folding up into the animal transfer box of FIG. 1.

Having now described the general construction of the animal transfer box 10, attention is directed to FIG. 10 which depicts the manufactured blank of the box 10 and will aid the reader in understanding better the details of the box. FIG. 10 depicts a blank 100 from which the animal transfer box 10 is fabricated. The blank 100 is precision cut and scored to allow the blank to be folded, glued and ultimately assembled into the finished box as depicted in the previous figures. The blank 100 is formed from paperboard or corrugated cardboard of the type and caliber conventionally available. Preferably, the blank 100 is formed from corrugated cardboard.

The blank 100 includes a first or left side panel 50, a second or right side panel 40, a bottom panel 60, and a top panel 70. As shown in FIG. 10, the first side panel 50 is formed between the bottom and top panels 60, 70. The second side panel 40 extends from the other side of the top panel 70 opposite the first side panel 50. The bottom and top panels 60, 70 further include edges, such as edges 61-64 of bottom panel 60 and edges 71-74 of top panel 70. Extending from the edge 61 of the bottom panel 60, blank 100 includes a rear bottom flap 87. Along the edge 63 of the bottom panel 60, blank 100 includes a plurality of front bottom flaps 77a-77c. Similarly, blank 100 includes a rear top flap 86 extending from edge 71 of the top panel 70 and a plurality of front top flaps 76a-76c along the edge 73 of the top panel 70.

The blank 100 further includes front corner flaps 53 and 43 and rear corner flaps 54 and 44. The front and rear corner flaps 43, 44 extend from distal edges of the second side panel 40. The front and rear corner flaps 53, 54 extend from distal edges of the first side panel 50. The blank 100 also includes a bonding or joint overlap panel or flap 45 extending from side panel 40 along edge 46 and provided with at least some glue or adhesive placed thereon preparatory to an initial folding step. The blank 100 is also provided with locking tabs 91a-91f and slots 92a-92f formed therein for securing the shape of the animal transfer box upon assembly. The blank 100 is designed to facilitate it being sold and shipped to end users in a flat configuration and then erected/assembled by the end user as needed. This saves space and expense in shipping the boxes for use.

The first folding operation is the folding of the blank portion 110, including the first side panel 50, top panel 70, second side panel 40 and joint overlap 45, about foldlines A-D (coinciding with edges 62, 74, 72, and 46). With adhesive previously having been applied to at least some portions of the joint overlap 45, the joint overlap 45 is adhered to the left side portion along edge 64 of the bottom panel 60.

Figure 8:
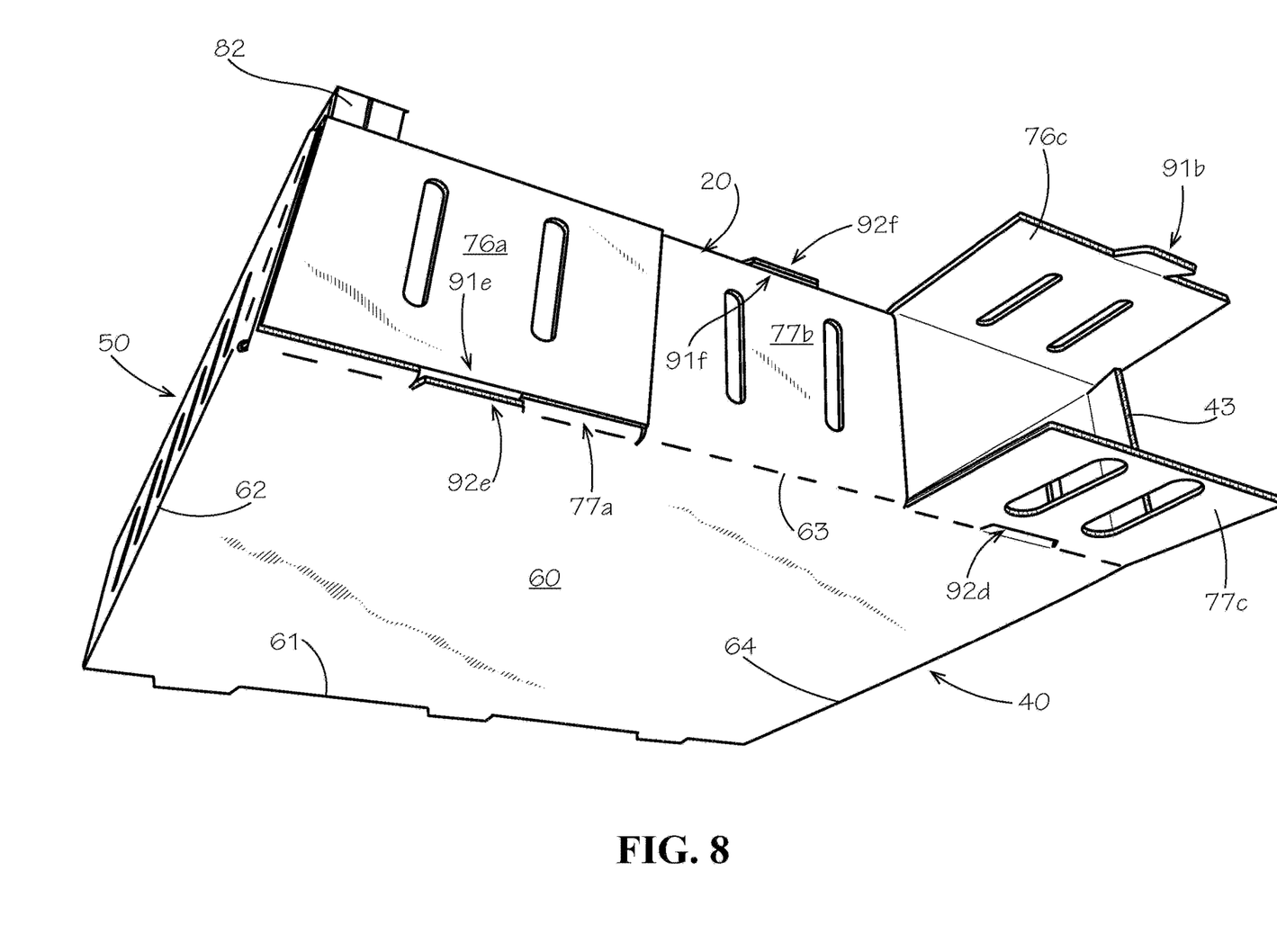
FIG. 8 is a front perspective view of the animal transfer box of FIG. 1, shown with an entry door portion of the animal transfer box in an opened configuration for admitting animals therein, viewed from below.
Figure 9:
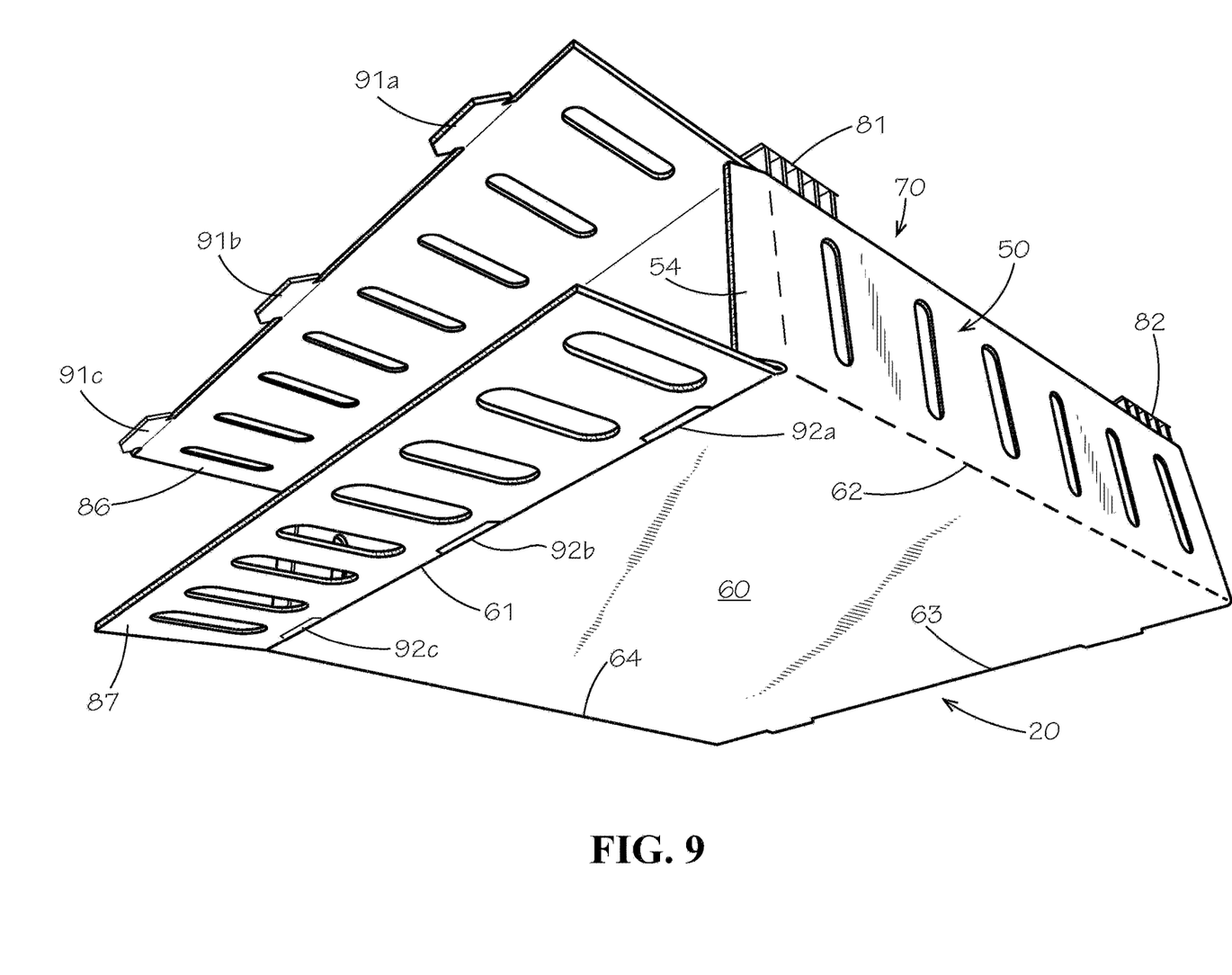
FIG. 9 is a rear perspective view of the animal transfer box of FIG. 1, shown with an exit door portion of the animal transfer box in an opened configuration for releasing animals therefrom, viewed from below and from the rear/side.

The second folding operation is the folding of the front and rear corner covers or flaps 43, 44, 53 and 54. For example, as best shown in FIGS. 8 and 9, corner flaps 44 and 53 are folded inwards between the top and bottom panels 70, 60. The corner flaps, when folded in, provide structural support and cover at the corners of the transfer box 10. Specifically, the folded corner flaps prevent the corners of the transfer box from collapsing in under excessive load or force. The corner flaps are particularly helpful when multiple ones of the transfer box are stacked on top of one another and the spacers between the transfer boxes are secured to the corners of each box. The corner flaps also provide extra coverage over any gaps that can occur at the corners of the transfer box 10 if one or more corners collapse under load.

The third folding operation is the folding of the rear bottom and top flaps 87, 86 as shown in FIG. 9 and forming the double-walled rear end panel 30 comprising a full-length door. When the rear bottom flap 87 is folded up towards the top panel 70, slots 92a-92c are formed at the foldline between rear bottom flap 87 and bottom panel 60. Slot 92a-92c are configured for receiving corresponding tabs 91a-91c along the rear top flap 86. Once rear bottom flap 87 is folded upright, rear top flap 86 is folded down towards the bottom panel 60 and the locking tabs 91a-91c are pressed into slots 92a-92c, respectively. Locking tabs 91a-91f are configured for being easily pressed into corresponding slots 92a-92f but more difficult to remove from the slots once engaged. In example forms, locking tabs 91a-91f comprise a wide head portion with a narrow neck portion connecting the tab head portion to an edge of the animal transfer box 10. The head portion is tapered to assist in the insertion of the tabs into the corresponding slots.

Figures 5, 6:
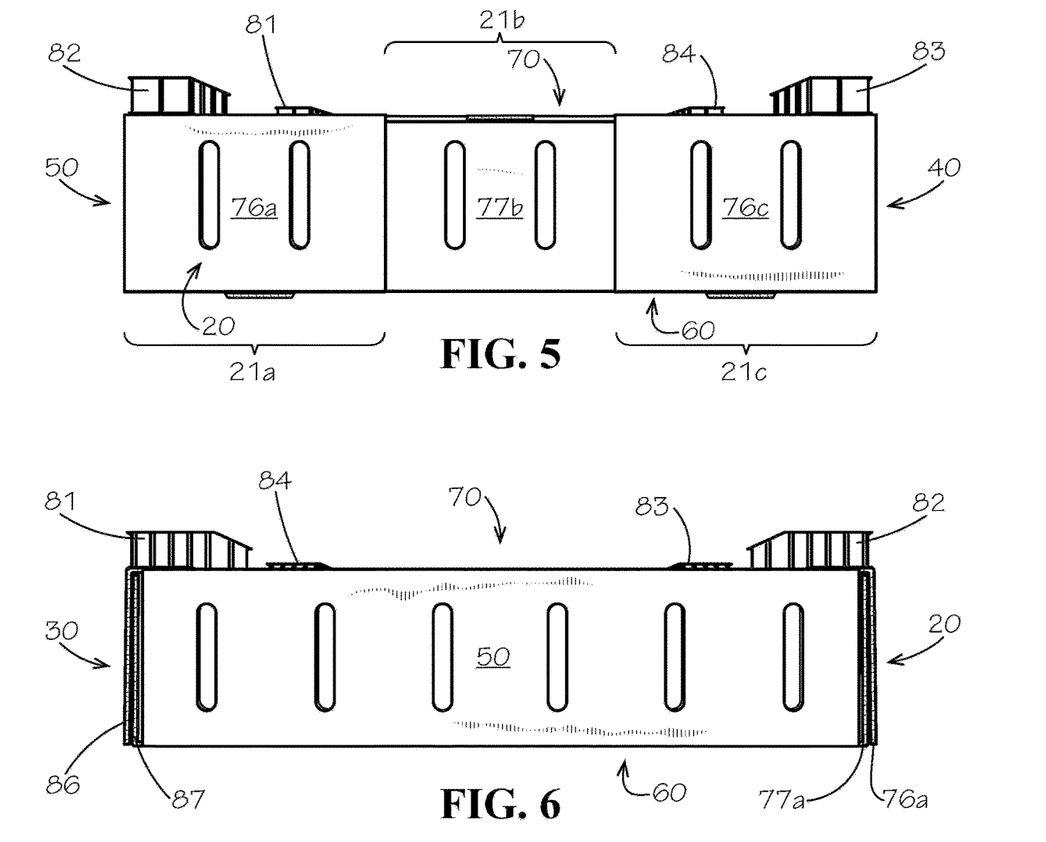
FIG. 5 is a front elevation view of the animal transfer box of FIG. 1.
FIG. 6 is a side elevation view of the animal transfer box of FIG. 1.
Figure 7:
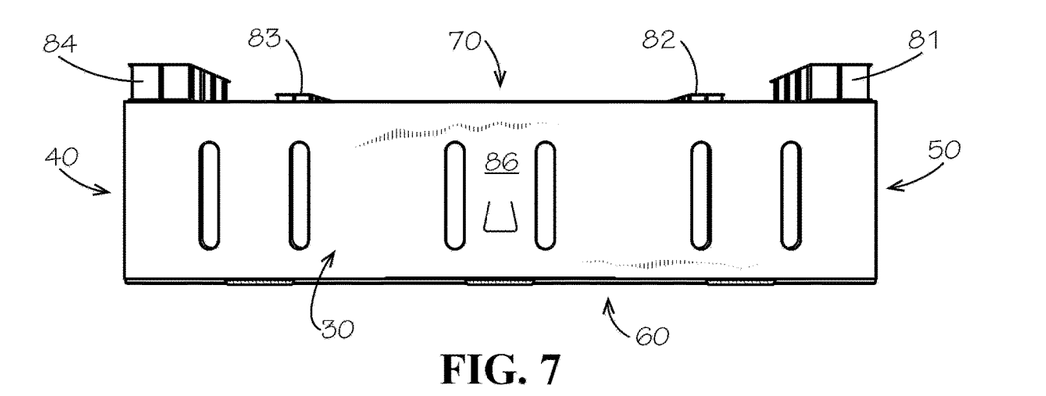
FIG. 7 is a rear elevation view of the animal transfer box of FIG. 1.

The fourth folding operation is the folding of the front top and bottom flaps 76a-76c, 77a-77c and forming the double-walled front end panel 20. As best shown in FIGS. 5 and 8, the front panel comprises one or more partial-length doors or portions 21a-21c formed along the front end panel 20. In example forms, the animal transfer box 10 includes a right partial-length door 21a, comprising front bottom flap 77a and front top flap 76a, and a left partial-length door 21c, comprising front bottom flap 77*c* and front top flap 76*c*. A center partial-length door 21*b*, comprising front bottom flap 77*b* and top flap 76*b*, is provided between the right and left partial-length doors 21*a*, 21*c*. In example forms, the bottom flaps 77*a* and 77*c* are folded up towards the top panel 70 exposing slots 92*d* and 92*e* along the foldline between the bottom panel 60 and front bottom flaps 77*a* and 77*c*. The front top flaps 76*a* and 76*c* are folded down towards the bottom panel 60 and secured over the bottom flaps 77*a* and 77*c*, respectively, by engaging tabs 91*d* and 91*e* into slots 92*d* and 92*e*, respectively. Conversely, in forming the center partial-length portion 21*b*, top flap 76*b* is folded down towards the bottom panel 60 exposing slot 92*f*. Bottom flap 77*b* is then folded up towards the top panel 70 and secured over the top flap 76*b* by engaging tab 91*f* into slot 92*f*.

Figure 4:
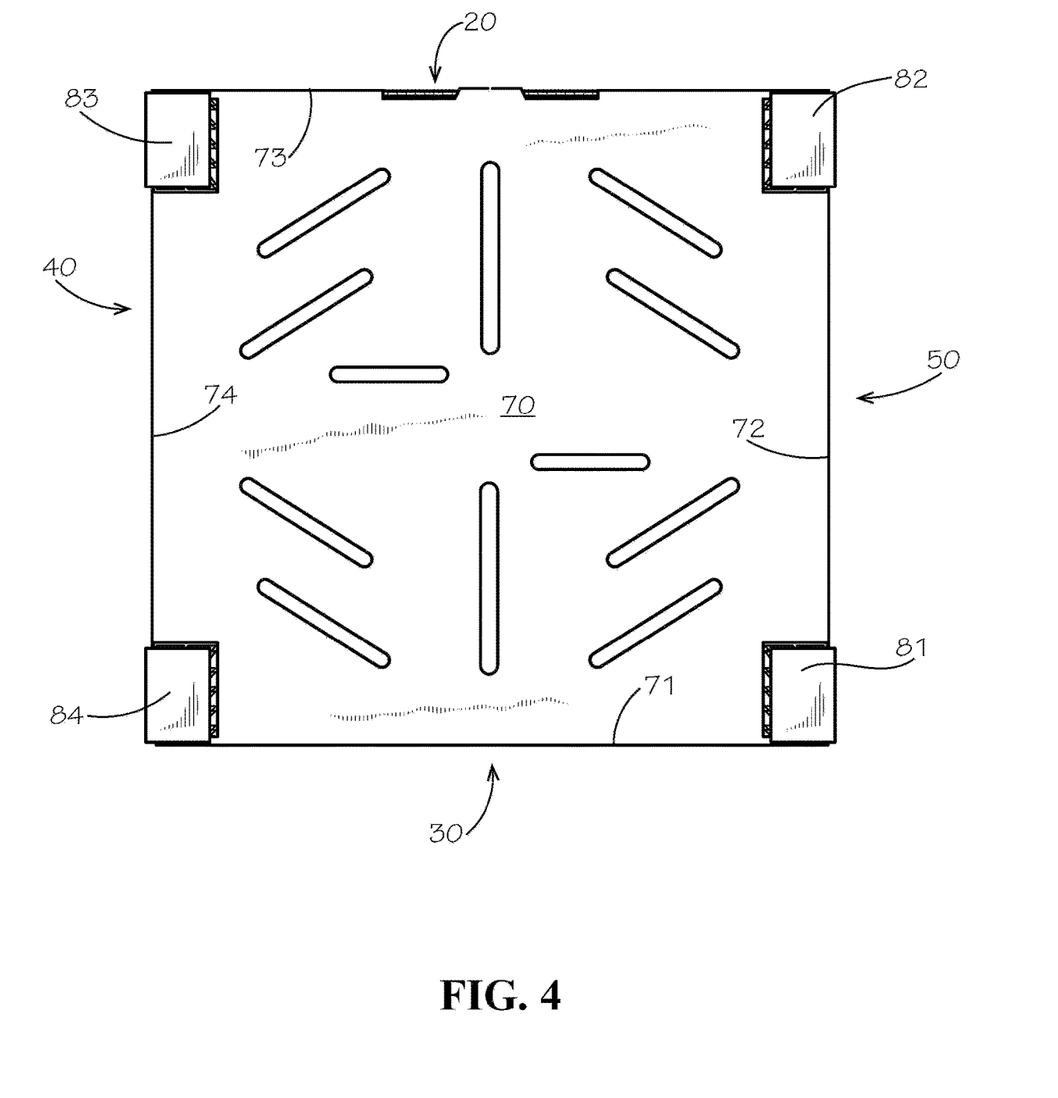
FIG. 4 is a plan view of the animal transfer box of FIG. 1.

As shown in FIGS. 1 and 4, a plurality of spacers 81-84 are then glued, taped or otherwise mounted to the top panel 70. The spacers are formed from paperboard or corrugated cardboard of the type and caliber conventionally available. The spacers are positioned adjacent corners of the top panel for allowing multiple ones of the transfer box to be stacked while still providing ventilation through the top panels. In example forms, the spacers are between about ½ inches and 1½ inches high. More preferably, the spacers are about 1 inch high. In some forms, the spacers can be positioned adjacent corners or edges of the bottom panel, in which case they might be referred to as feet.

In example forms, when erect, the transfer box measures between about 18 inches and about 21 inches, or preferably about 19 inches and about 20 inches, from the front end panel 20 to the rear end panel 30. In example forms, the transfer box measures between about 19 inches and about 22 inches, or preferably about 20 inches and about 21 inches, from the first side panel 50 to the second side panel 40. In example forms, the end panels 20 and 30 and the side panels 40 and 50 are between about 4 inches and about 6 inches high. More preferably, the end panels and the side panels are between about 4½ inches and about 5½ inches high.

In example forms, one or more of the side, end, top and/or bottom panels comprise cutouts or holes for providing ventilation. While the depicted embodiment of FIGS. 1-10 provides one example configuration of oblong ventilations holes, various shapes, forms and configurations of ventilations holes or apertures can be provided. In example forms, the ventilation holes of the top and bottom flaps of end panels 20 and 30 are aligned to reduce choking and maximize air flow. Preferably, the inner flaps of the end panels 20 and 30, for example, rear bottom flap 87, front bottom flaps 77*a* and 77*c*, and front top flap 76*b*, comprise larger ventilation holes or openings than the corresponding outer flaps of the end panels, for example, rear top panel 86, front top flaps 76*a* and 76*c*, and front bottom flap 77*b*, so that they reliably overlap when the box is assembled. Larger ventilation holes are provided on the inner flaps to better ensure proper alignment and maximize air flow through the transfer box 10. In example forms, the larger ventilation holes of the inner flaps measure about 3½ inches by about 1 inch whereas the smaller ventilation holes of the outer flaps measure about 3 inches by about ½ inches.

In example forms of use, the user erects the animal transfer box 10 from the box blank 100 as described herein. To fill the transfer box 10, the user opens one or more doors 21*a*-21*c* and inserts, or otherwise mounts, a feeder channel or funnel into the open door(s). The live animals to be transported, such as quail, are guided or herded into transfer box 10 through the feeder funnel and door(s) 21*a*, 21*b* and/or 21*c*. Once the desired number of animals are guided into the transfer box 10, the feeder funnel is removed and all the doors are securely closed as described herein.

During transportation and/or storage, multiple ones of the transfer box can be stacked on top of one another. Ventilation holes on the top panels 70 provide ventilation of air through the transfer box and prevent heat from building up therein. In example forms, ventilation holes are not provided on the bottom panels 60 to prevent excrements and other wastes from dropping down from one transfer box on to another transfer box below when stacked. Spacers and/or feet are further provided to ensure proper ventilation. In some example forms, ventilation holes can be provided on the bottom panel 60 and not provided on the top panel 70. In other example forms, ventilation holes can be provided on both top and bottom panels 70, 60.

When the animals, such as quail, are to be released, the user sets the transfer box 10 on the ground or surface in the field or destination and opens the rear panel 30 by unlatching the tabs 91*a*-91*c* along the rear top flap 86 from the slots 92*a*-92*c* along the rear bottom flap 87 and bottom panel 60. Optionally, one or more of the front doors 21*a*-21*c* can be additionally opened or as an alternative to opening the rear door. Once the rear panel 30 is opened, the animals can be allowed to leave and re-enter the transfer box 10 freely. In example modes of use, the transfer box 10 can be left in the field or on site to function as the animals' temporary nest or shelter. The transfer box 10 preferably is comprised of biodegradable cardboard or material, allowing the user to leave the transfer box in the field and reducing waste and inconvenience of retrieving the transfer box at a later time.

An animal transfer box for containing and transporting smallish live animals, such as quail, according the example forms of the present invention has numerous advantages. For example, it reduces stress on the animals, which protects their health and lives. It also is relatively low cost to make and use. It is easy to assemble and can be assembled quickly. It is cheaper to make and acquire than a plastic coop. It also does not require any hardware or tools to assemble or use the box. It is easily and cheaply shipped in its flat, unerected configuration and then assembled/erected once received by the purchaser/user. It allows for easy and convenient shipping of animals, particularly birds. Moreover, it provides good flexibility in the numbers of birds or other animals contained in the box. In the example size depicted herein, up to 25 or 30 quails can be contained and shipped in the box.

The animal transfer box for containing and transporting smallish live animals, such as quail, according the example forms of the present invention provides excellent ventilation or air flow, which helps keep the birds cool and comfortable in close quarters with other birds. The tabs provide a very secure construction and can be configured as shown in the figures to provide a very secure structure that does not easily come apart on its own or by efforts by the birds contained therein. Overall, the animal transfer box is rather user-friendly—it is of a convenient size and bulk to be readily handled, it is easily assembled, it is easily stacked, etc.

Further, owing to its low cost, its intended one-time use, and the fact that it is made with cardboard, the box provides good "bio-security" by avoiding or minimizing the opportunities for back and forth contaminations between multiple facilities. If the box were more permanent, such as if it were made of metal or rigid plastic, users might be more likely to re-use the box for additional shipping, increasing the risk of bio-contaminations between various users of the box. Also, the cardboard is not as susceptible to hosting a live contamination as other materials (for example, metal or plastic).

While the invention has been disclosed in preferred forms, it will be apparent to those skilled in the art that many modifications, additions, and deletions may be made therein without departing from the spirit and scope of the invention as set forth in the following Claims.

What is claimed is:

1. An animal transfer box for containing and transporting live animals, said animal transfer box comprising:
   a first ventilated end panel having a partial-length door formed therein extending only partially along said first ventilated end panel, said partial length door being openable by being pivoted vertically and permitting controlled ingress of live animals into the interior of the animal transfer box when open;
   a second ventilated end panel having a full-length door formed therein and positioned opposite said first ventilated end panel, said full-length door extending along substantially the entirety of the length of said first ventilated end panel, said full-length door permitting unrestricted egress of live animals out from the interior of the animal transfer box when open;
   two ventilated side panels opposite each other and connected to said end panels;
   a substantially non-ventilated bottom panel connected to said side panels;
   a ventilated top panel connected to said side panels; and
   wherein said end panels, said side panels, said bottom panel, and said top panel are formed from a single blank of cardboard and folded up to form the animal transfer box, said single blank of cardboard having tabs and slots formed therein for securing the shape of the animal transfer box upon assembly.

2. An animal transfer box as claimed in claim 1 further comprising spacers positioned adjacent corners of said top panel or bottom panel for allowing multiple ones of the transfer box to be stacked while still providing ventilation through the top panels.

3. An animal transfer box as claimed in claim 1 wherein said single blank of cardboard comprises corrugated cardboard.

4. An animal transfer box as claimed in claim 1 wherein said end panels each comprise double-wall panels.

5. An animal transfer box as claimed in claim 1 wherein said end panels and said side panels are between about 11 centimeters (4½) inches and 14 centimeters (5½ inches) high.

6. An animal transfer box as claimed in claim 1 wherein said end panels and said side panels are between about 10 centimeters (4 inches) and 15 centimeters (6 inches) high.

7. An animal transfer box as claimed in claim 1 wherein said single blank of cardboard comprises tabs and slots formed therein for securing the one or more vertically-openable doors as well as the shape of the animal transfer box once assembled.

* * * * *